(12) United States Patent
Mitra et al.

(10) Patent No.: US 7,107,277 B1
(45) Date of Patent: Sep. 12, 2006

(54) PROGRAMMABLE CALCULATION ENGINE

(75) Inventors: Kanchan Mitra, Woodinville, WA (US); Anna V. Timasheva, Seattle, WA (US); Dipan Dewan, Sammamish, WA (US); Kenneth L. Crocker, Sammamish, WA (US); Robert E. Corrington, Kirkland, WA (US); David V. Gunter, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 538 days.

(21) Appl. No.: 10/321,317

(22) Filed: Dec. 17, 2002

(51) Int. Cl.
*G06F 17/30* (2006.01)

(52) U.S. Cl. .................. 707/100; 707/3; 707/100; 707/503

(58) Field of Classification Search ................ 707/503, 707/3, 100; 715/503
See application file for complete search history.

(56) References Cited

U.S. PATENT DOCUMENTS

| | | | | |
|---|---|---|---|---|
| 5,873,081 A | * | 2/1999 | Harel | 707/3 |
| 5,970,506 A | * | 10/1999 | Kiyan et al. | 715/503 |
| 6,138,130 A | * | 10/2000 | Adler et al. | 715/503 |
| 6,199,078 B1 | * | 3/2001 | Brittan et al. | 715/503 |
| 6,292,938 B1 | * | 9/2001 | Sarkar et al. | 717/138 |
| 6,859,907 B1 | * | 2/2005 | McGarry | 715/503 |
| 7,007,009 B1 | * | 2/2006 | Bestgen et al. | 707/3 |

* cited by examiner

*Primary Examiner*—Don Wong
*Assistant Examiner*—Thanh-Ha Dang
(74) *Attorney, Agent, or Firm*—Banner & Witcoff, Ltd.

(57) ABSTRACT

A calculation engine processes user-definable formulas to generate calculation results. A calculation engine may use the following types of data structures: table, column, row, and field. A sub table may be embedded within a row. Operations may be performed at various levels, such as at: table, column, and field. A calculation engine may operate on a calculation table having columns, which may each have an ordered list of formulas. Formulas within such an ordered list may be evaluated in the order specified until one of the formulas is successfully evaluated. A hierarchy of formulas may be formed by a column's formula depending on another column or table. A graph of data dependencies may be prepared for determining an order in which operands and operations should be evaluated and performed.

6 Claims, 6 Drawing Sheets

| CUSIP | Quantity | Price | %MV / AC |

| MarketValue | Valuation | FxRate | AssetClass |

| Rowid | CUSIP | Quantity |
|---|---|---|
| 1 | 222444 | 100 |
| 2 | 111333 | 200 |
| 3 | 444555 | 100 |
| 4 | 111333 | 50 |
| 5 | 444555 | 360 |

| Rowid | CUSIP | Quantity | Price | %MV / AC |
|---|---|---|---|---|
| 1 | | | | |
| 2 | | | | |
| 3 | | | | |
| 4 | | | | |
| 5 | | | | |

| Rowid | CUSIP | Quantity | Price | %MV / AC |
|---|---|---|---|---|
| 1 | 222444 | 100 | | |
| 2 | 111333 | 200 | | |
| 3 | 444555 | 100 | | |
| 4 | 111333 | 50 | | |
| 5 | 444555 | 360 | | |

| CUSIP | Price | Valuation | FXRate | AssetClass |
|---|---|---|---|---|
| 222444 | 100.00 | 1.0 | 1.0 | Stock |
| 111333 | 20.00 | 1.0 | 1.0 | Stock |
| 444555 | 40.00 | 1.0 | 1.0 | Bond |

| Rowid | CUSIP | Quantity | Price | %MV / AC | MV | AssetClass |
|---|---|---|---|---|---|---|
| 1 | 222444 | 100 | 100.00 | | 10000.00 | Stock |
| 2 | 111333 | 200 | 20.00 | | 4000.00 | Stock |
| 3 | 444555 | 100 | 40.00 | | 4000.00 | Bond |
| 4 | 111333 | 50 | 20.00 | | 1000.00 | Stock |
| 5 | 444555 | 360 | 40.00 | | 14400.00 | Bond |

| Asset Class | MV | Table | | | | | |
|---|---|---|---|---|---|---|---|
| Stock | 15000.00 | | | | | | |
| | | Rowid | CUSIP | Quantity | Price | MV | AssetClass |
| | | 1 | 222444 | 100 | 100.00 | 10000.00 | Stock |
| | | 2 | 111333 | 200 | 20.00 | 4000.00 | Stock |
| | | 4 | 111333 | 50 | 20.00 | 1000.00 | Stock |
| Bond | 18400.00 | | | | | | |
| | | Rowid | CUSIP | Quantity | Price | MV | AssetClass |
| | | 3 | 444555 | 100 | 40.00 | 4000.00 | Bond |
| | | 5 | 444555 | 360 | 40.00 | 14400.00 | Bond |

| Rowid | CUSIP | Quantity | Price | %MV / AC | MV | AssetClass |
|---|---|---|---|---|---|---|
| 1 | 222444 | 100 | 100.00 | 66.67% | 10000.00 | Stock |
| 2 | 111333 | 200 | 20.00 | 26.67% | 4000.00 | Stock |
| 3 | 444555 | 100 | 40.00 | 21.73% | 4000.00 | Bond |
| 4 | 111333 | 50 | 20.00 | 6.66% | 1000.00 | Stock |
| 5 | 444555 | 360 | 40.00 | 78.26% | 14400.00 | Bond |

FIGURE 14

PROGRAMMABLE CALCULATION ENGINE

TECHNICAL FIELD

The invention relates generally to performing computerized mathematical computations. More particularly, the invention relates to a user-programmable calculation engine.

BACKGROUND OF THE INVENTION

The ability of computer software to perform programmable mathematical calculations is desirable in various circumstances. For instance, such a circumstance is a Web service that financial advisory firms (i.e., firms that provide investment advice) can use for presenting account statements to be viewed securely by their clients. In presenting account statements in this manner, it would be desirable to be able to meet the needs of multiple financial institutions in a way other than one-off (i.e., customized) code for each financial advisory firm.

In this context, conventional approaches tend to use different customized code for different calculations specified by different financial institutions. For instance, different financial institutions may use different formulas for calculating a client's return on investment. According to conventional techniques, a data feed, such as an XML feed, comes from each financial institution with information about investment portfolios of the financial institutions' clients. Calculations are then performed on the fly so that statements can be presented to users on demand.

An investor may request that a portfolio statement be displayed in a particular format, such as sorted or grouped in any of various ways, such as grouped by asset class (e.g., stocks, bonds, cash and the like). If different financial institutions organize and/or define their data and/or output specifications differently, then, according to conventional techniques, custom code would typically be implemented for performing calculations and presenting data in various ways that are specific to various financial institutions.

A programmable calculation engine, which operates independently of any assumptions about the organization of the data that it operates on, would therefore be desirable.

SUMMARY OF THE INVENTION

A system and method in accordance with the present invention overcomes the foregoing shortcomings of conventional techniques for implementing custom calculations.

In accordance with an illustrative embodiment of the invention, a calculation engine processes user-definable formulas to generate calculation results. A calculation engine may operate on a calculation table, which may include one or more sub tables. A calculation-table column may have an ordered list of formulas. Each formula may contain references to values within one or more data-source lookup tables for fetching operand data values from this type of table. A data-source-lookup table may correspond to a quote feed, a database, or any other suitable data source. Formulas within an ordered list of formulas may be evaluated in the order specified by the list until one of the formulas is successfully evaluated or, stated differently, until a calculation result is successfully generated. A hierarchy of formulas may be formed by a column's formula depending on another column or table. When a formula depends on another table, the formula may indirectly depend on a data source corresponding the table that the formula depends on.

While the calculation engine may provide primitive functions, such as addition, multiplication, and the like, users of the calculation engine may extend the calculation engine's functionality by defining additional functions. Similarly, a user of the calculation engine may also extend, via customized calculation specifications, the number and/or type of data sources from which the calculation engine obtains data for performing customized calculations.

The calculation engine may perform calculations on an investor's investment portfolio data and may aggregate data from disparate data sources, such as a real-time stock-quote data feed. The calculation engine may fail over to backup calculation formulas gracefully thereby enabling a wide variety of data sources for a single piece of data.

A calculation engine in accordance with an illustrative embodiment of the invention is not limited to performing calculations on financial information. Rather a calculation engine of this type is generic and may be used for performing calculations and/or aggregating data from custom-defined disparate data sources in any number different contexts.

In accordance with an illustrative embodiment of the invention, a website for a financial advisory firm may be hosted on a server. The firms' clients may use another computer to retrieve their investment data from that server. A financial firm may upload their clients' investment data to the website, which may comprise investors' portfolios. The firm may also upload configuration information for customizing the calculation engine. The firm's clients may then retrieve data securely from the website for viewing. The portfolio data may be supplemented with one or more data feeds, such as real-time stock quotes.

A calculation engine, in accordance with an illustrative embodiment of the invention, may be data driven, which means that, when performing calculations that differ from one another, how the calculation engine operates remains unchanged, but the configuration of calculation specifications and/or data sources will be different.

Calculation specifications, which are input to the calculation engine, typically specify one or more mathematical operations to be performed and may specify one or more data feeds or sources of the data operated on by the calculation. Any of the formulas may specify data sources for one or more terms (also referred to as operands) of a formula.

In accordance with an illustrative embodiment of the invention, a language is provided by which users may specify precisely how calculations should be performed and what data sources should be used, in which order, for performing calculations. Definitions for a hierarchy of input sources, how calculations should be performed, and how output should be rendered (such as how grouping and/or subtotaling of data should be performed) may be input to the calculation engine.

A calculation engine in accordance with an illustrative embodiment of the invention may use the following types of data structures: table, column, row, and field. A table may include a custom-defined function, may be null, may comprise: values from a database; values from a quote feed; or may be embedded as a subtable within a row of another table.

A table may be made up of one more horizontal rows and one or more vertical columns. An intersection of a row and a column is referred to as a field.

A table may be embedded within a row. Such an embedded table may be referred to as a subtable. If grouping has been done, a subtable may be used for computing a value of a field. In other words, subtotaling may be performed on a subtable to compute a value, which may then be used elsewhere.

A column may have properties, such as a name, one or more formulas, and a default aggregation function, which may be used for subtotaling. For instance for market value the aggregating function may be sum. Other aggregating functions may also be used such as mean or average.

A set of field values forms a key, which may identify a row in a table. A field may be specified by specifying a row and column. A field may have the following properties, a column, which may be used for obtaining a column definition; and, a null value, or, when data is available, a literal value.

A calculation engine, in accordance with an illustrative embodiment of the invention, may perform operations at various levels, such as at: a table level, a column level, and a field level. Table-level operations or functions may include grouping and/or sorting. Aggregation over a subset of rows of a table may be achieved through a Group function. The Group function may provide automatic aggregation by subtotals. This may be achieved by combining the Group operation with a column function for aggregation.

Before the calculation engine performs calculations, the calculation engine may build a dependency graph of data dependencies. The components of the dependency graph may be tables, fields and columns. The dependency graph may be prepared for determining an order in which operands and operations of a calculation should be evaluated and performed.

In accordance with various inventive principles, users of the calculation engine, such as financial institutions, are able to specify how they want particular calculations performed. An software vendor may test a calculation engine of this type one time and then sell it to as many users, such as financial institutions, as possible thereafter without having to retest a customized implementation each time.

The calculation engine's data-driven model prevents the engine from making assumptions about the type of data the engine is working on. This approach adds flexibility by allowing the engine to perform calculations on highly customizable data. Stated differently, assumptions regarding the underlying data sources and data structures are avoided, thereby making the engine independent of the format/schema of the data.

Additional features and advantages of the invention will be apparent upon reviewing the following detailed description.

BRIEF DESCRIPTION OF THE DRAWINGS

FIG. 9 depicts a calculation table, in accordance with an illustrative embodiment of the invention, with a single column filled in.

DETAILED DESCRIPTION OF THE INVENTION

In accordance with an illustrative embodiment of the invention, a calculation engine processes user-definable formulas to generate calculation results. A calculation engine may operate on a calculation table, which may include one or more sub tables. A calculation-table column may have an ordered list of formulas. Each formula may contain references to values within one or more data-source lookup tables for fetching operand data values from this type of table. A data-source-lookup table may correspond to a quote feed, a database, or any other suitable data source. Formulas within an ordered list of formulas may be evaluated in the order specified by the list until one of the formulas is successfully evaluated or, stated differently, until a calculation result is successfully generated. A hierarchy of formulas may be formed by a column's formula depending on another column or table. When a formula depends on another table, the formula may indirectly depend on a data source corresponding the table that the formula depends on.

While the calculation engine may provide primitive functions, such as addition, multiplication, and the like, users of the calculation engine may extend the calculation engine's functionality by defining additional functions. Similarly, a user of the calculation engine may also extend, via customized calculation specifications, the number and/or type of data sources from which the calculation engine obtains data for performing customized calculations.

The calculation engine may perform calculations on an investor's investment portfolio data and may aggregate data from disparate data sources, such as a real-time stock-quote data feed. The calculation engine may fail over to backup calculation formulas gracefully thereby enabling a wide variety of data sources for a single piece of data.

A calculation engine in accordance with an illustrative embodiment of the invention is not limited to performing calculations on financial information. Rather a calculation engine of this type is generic and may be used for performing calculations and/or aggregating data from custom-defined disparate data sources in any number different contexts, such as calculating the calorie content of various meals, calculating a person's blood-pressure, ranking college football teams, and any other situation in which mathematical calculations are performed.

Aspects of the invention are suitable for use in a variety of computing system environments, including distributed computing environments. In distributed computing environments, tasks may be performed by remote computer devices that are linked through communications networks. Embodiments of the present invention may comprise special purpose and/or general purpose computer devices that each may include standard computer hardware such as a central processing unit (CPU) or other processing means for executing computer executable instructions, computer readable media for storing executable instructions, a display or other output means for displaying or outputting information, a keyboard or other input means for inputting information, and so forth. Examples of suitable computer devices include hand-held devices, multiprocessor systems, microprocessor-based or programmable consumer electronics, networked PCs, minicomputers, mainframe computers, and the like.

The invention will be described in the general context of computer-executable instructions, such as program modules, that are executed by a personal computer or a server. Generally, program modules include routines, programs, objects, components, data structures, etc., that perform particular tasks or implement particular abstract data types. Typically the functionality of the program modules may be combined or distributed as desired in various environments.

Embodiments within the scope of the invention also include computer readable media having executable instructions. Such computer readable media can be any available media, which can be accessed by a general purpose or special purpose computer. By way of example, and not limitation, such computer readable media can comprise RAM, ROM, EEPROM, CD-ROM or other optical disk storage, magnetic disk storage or other magnetic storage devices, or any other medium which can be used to store the desired executable instructions and which can be accessed by a general purpose or special purpose computer. Combinations of the above should also be included within the scope of computer readable media. Executable instructions comprise, for example, instructions and data which cause a general purpose computer, special purpose computer, or special purpose processing device to perform a certain function or group of functions.

Figure 1:
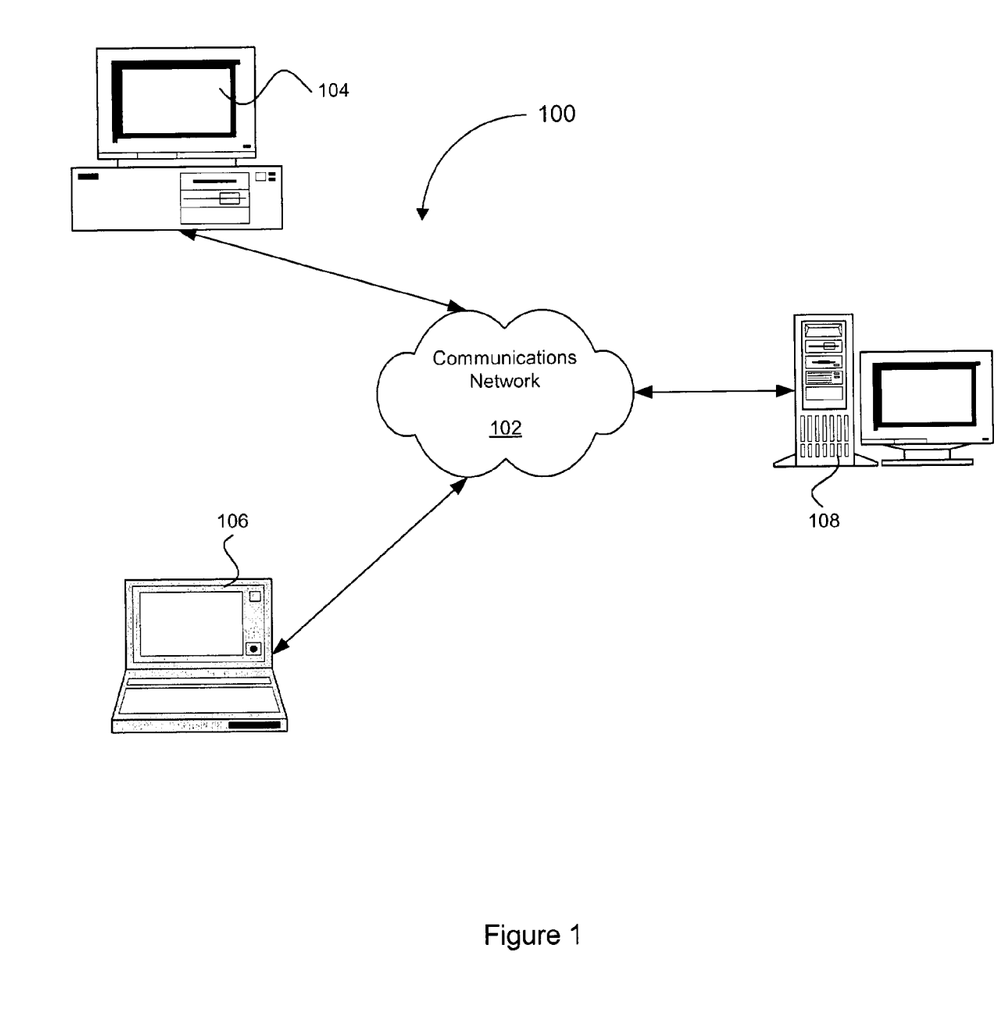
FIG. 1 is a schematic block diagram of a conventional distributed general-purpose digital computing environment that can be used to implement various aspects of the invention.

FIG. 1 illustrates an example of a suitable distributed computing system 100 operating environment in which the invention may be implemented. Distributed computing system 100 is only one example of a suitable operating environment and is not intended to suggest any limitation as to the scope of use or functionality of the invention. System 100 is shown as including a communications network 102. The specific network implementation used can comprise, for example, any type of local area network (LAN) and associated LAN topologies and protocols; simple point-to-point networks (such as direct modem-to-modem connection); and wide area network (WAN) implementations, including public Internets and commercial based network services. Systems may also include more than one communication network, such as a LAN coupled to the Internet.

Computer device 104, computer device 106, and computer device 108 may be coupled to communications network 102 through communication devices. Network interfaces or adapters may be used to connect computer devices 104, 106, and 108 to a LAN. When communications network 102 includes a WAN, modems or other means for establishing communications over WANs may be utilized. Computer devices 104, 106 and 108 may communicate with one another via communication network 102 in ways that are well known in the art. The existence of any of various well-known protocols, such as TCP/IP, Ethernet, FTP, HTTP and the like, is presumed.

Computer devices 104, 106 and 108 may exchange content, applications, messages and other objects via communications network 102. In some aspects of the invention, computer device 108 may be implemented with a server computer or server farm. Computer device 108 may also be configured to provide services to computer devices 104 and 106. Alternatively, computing devices 104, 106, and 108 may also be arranged in a peer-to-peer arrangement in which, for a given operation, ad-hoc relationships among the computing devices may be formed.

In accordance with an illustrative embodiment of the invention, a website for a financial advisory firm may be hosted on a computer device, such as computer device 108, from which the firm's clients may use a computer device, such as computer device 106, to retrieve their investment data. The calculation engine may reside on any of the computer devices 104, 106, and 108 and may be instantiated when a user makes a request to view a portfolio page. A financial firm may upload their clients' investment data to computer device 108 from a computer device, such as computer device 104. The data may comprise investors' portfolios. The firm may also upload configuration information for customizing the calculation engine. The firm's clients may then retrieve data securely from the website for viewing. The portfolio data may be supplemented with one or more data feeds, such as real-time stock quotes.

Figure 2:
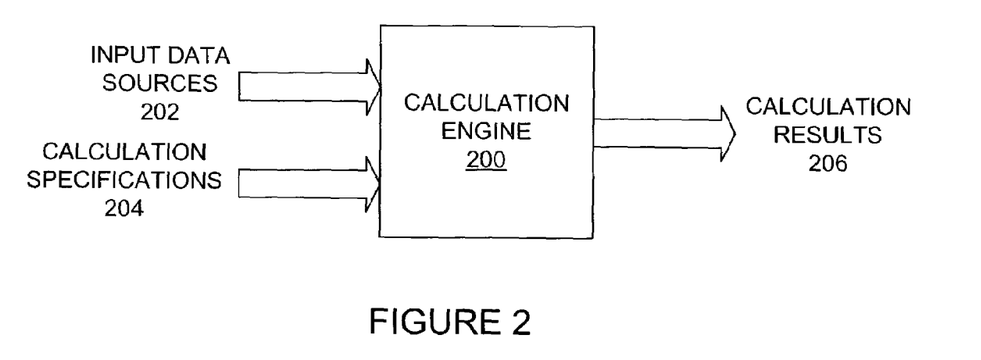
FIG. 2 is a schematic block diagram of data flow to and from a calculation engine in accordance with an illustrative embodiment of the invention.

Referring to FIG. 2, a calculation engine 200 in accordance with an illustrative embodiment of the invention, may be data driven, which means that, when performing calculations that differ from one another, how the calculation engine operates remains unchanged, but the configuration of calculation specifications and/or data sources will be different. For instance, if a first financial institution calculates return on investment differently than a second financial institution, the calculation specifications 204 and/or the data sources 202, which are inputs to the calculation engine, will differ, but the calculation engine 200 itself need not change.

Risk calculations are a good example of the type of calculation that may be customized differently by different financial institutions. Risk may even be defined differently depending upon an investor's other holdings. For instance, the less diversified a portfolio is, the higher the risk assessment may be for a particular holding in accordance with any of various techniques for assessing risk.

Calculation results 206 from the calculation engine may be output to a display engine, a PDA, an XML feed that goes off for further processing, or to any other suitable type of output destination.

Calculation specifications, which are input to the calculation engine, typically specify one or more mathematical operations to be performed and may specify one or more data feeds or sources of the data operated on by the calculation. Any of the formulas may specify data sources for one or more terms (also referred to as operands) of a formula. For instance, a data source could be a data feed, such as a data feed from: a web service, a financial advisory firm, a stock exchange, and the like.

For a particular calculation, a hierarchy of formulas may be specified. The holdings of an investor's portfolio (i.e., what investments an investor owns) may serve as initial values for calculations used in connection with displaying an investor's portfolio in a desired format. Portfolio values may be input to the calculation engine from a user, from a financial institution's web site, or from any other suitable data source.

A calculation specification may be defined via XML schema and, as previously mentioned, may include an ordered list of one or more formulas each of which may specify data sources for one or more elements of a formula. For instance, an ordered list of formulas for calculating the market value (i.e., current value) of a holding may specify a first formula of:

market value=last price×quantity

A second formula in the list may specify that market value should be looked up from a database. The first formula in the hierarchy may specify a list of data sources 202 for last price and/or quantity. For instance, the first formula for the last-price operand may be a lookup from a data feed from a web site. An example of such a formula is:

lastPrice=Quote[$cusip$][lastPrice]

A second or fallback formula for last price may be a database look up. A database look up may be specified as a data source for the quantity operand. An example of such a formula is:

quantity=$DB$[row$id$][quantity]

In evaluating market value according to this ordered list of formulas, an attempt may be made to obtain a value for the last-price operand. If market value is being calculated for multiple investments (also referred to as holdings) within a portfolio, call outs from the calculation engine to a data source for last-price values may be batched to reduce the number of external callouts performed. So, if there are 25 holdings within a portfolio, instead of performing 25 separate call outs to obtain the 25 separate last-price values, a single call that requests the 25 last-price values may be made. There may be multiple holdings that share the same symbol. They may be coalesced into a single lookup instead of looking up the same symbol multiple times.

After obtaining a value for last price, then an attempt may be made to obtain a value for the quantity operand for the number of investments for which the calculation is being performed. Upon obtaining the quantity values, then the last-price operand may be multiplied by the corresponding quantity operand to calculate the market value result for each holding. If none of the formulas are successfully evaluated, then the calculation engine may output an indication, such as an error message, that the calculation has failed.

A stock quote lookup may be depicted as a function as follows

Quote[cusip][LastPrice]

In accordance with an illustrative embodiment of the invention, a language is provided by which users may specify precisely how calculations should be performed and what data sources should be used, in which order, for performing calculations. Definitions for a hierarchy of input sources, how calculations should be performed, and how output should be rendered (such as how grouping and/or subtotaling of data should be performed) may be input to the calculation engine.

A calculation engine in accordance with an illustrative embodiment of the invention may use the following types of data structures: table, column, row, and field. A table may include a custom-defined function, may be null, may comprise: values from a database; values from a quote feed; or may be embedded as a subtable within a row of another table. The potential types of tables may be expressed as Table::=custom|Ø|$DB$|Quote|Row.Table$_{group}$ A database value or a quote value may be the initial data that the calculation engine operates on. A database table may comprise rows of holdings having columns specifying quantity, price, and the like. Similarly, a table could be a quote lookup table wherein holdings may have identification numbers or holding ID numbers, such as an intrinsic row number. For quotes, a key could be a security's symbol, such as VTI, which is the symbol for an exchange-traded fund that represents a broad stock-market index. Columns of such a table may include last price, quantity, market value, and the like.

A table may be made up of one more horizontal rows and one or more vertical columns. An intersection of a row and a column is referred to as a field.

A table may be embedded within a row. Such an embedded table may be referred to as a subtable. If grouping has been done, a subtable may be used for computing a value of a field. In other words, subtotaling may be performed on a subtable to compute a value, which may then be used elsewhere.

A custom-specified table may include calling out to an externally defined function for populating one or more fields of the table.

A table may include one or more columns. Properties of a column and the relationship between a table and a column may be expressed as Column::=Table.Column A column may have one or more of these properties:

Name←name of column

Formula[n]←formulas for computation, which may
be ordered for specifying an ordered list of fall-
back formulas fn$_{COL}$<default group by aggregation function A column may have properties, such as a name, one or more formulas (for market value, a first formula could be to call out to a financial institution website for the market value, a second formula could be to calculate market value based on last price times quantity, and a third formula could be to lookup market value in a database), and a default aggregation function, which may be used for subtotaling. For instance for market value the aggregating function may be sum. Other aggregating functions may also be used such as mean or average. Symbol names may also be aggregated or merged so that multiple positions having a single symbol name may be aggregated into a single position for calculation and/or display purposes.

Column-sets may be used to define a default view for a portfolio by selecting preferred fields for the default view. A calculation engine may be initialized with a list of fields for it to evaluate in order to produce a desired set of results. A user of the calculation engine may specify a column-set for the calculation engine to evaluate.

A field may be specified by specifying a row and column. A field may have the following properties, a column, which may be used for obtaining a column definition; and, a null value, or, when data is available, a literal value.

Field::=Row[Column]

A field may have one or more of these properties:

Column←to get column definition literal|∅←when data is available

Calculation specifications 204 may define fields for the calculation engine to operate on. A field may define a name of a column and associated items regarding how to evaluate the field. A simple example of a field is "market value"; the field definition could include a formula of "price×quantity". A field may also elect to have secondary formulas as fallbacks in case a primary computation experiences a failure. For example, if the primary data source is a live quote feed, the fallback data source could be a cached quote from a database. Formula defined for various fields describe how to obtain data values for those fields, which may comprise custom calculations, data source lookups and/or built-in primitives. The calculation engine may evaluate these data sources in a specified order until one succeeds. In this way, automatic backup in failover situations, such as when a stock quote lookup fails because of a network failure, may be provided. A calculation-engine user may define custom data sources as desired.

The calculation engine 200 may go through fields of a calculation table to try to fill in missing values in accordance with an execution graph, which is discussed below. If a value is missing, one or more formulas associated with the field and/or column for that field may be used to compute the value.

A calculation engine, in accordance with an illustrative embodiment of the invention, may perform operations at various levels, such as at: a table level, a column level, and a field level.

Table-level operations or functions may include grouping and/or sorting. Custom table-level functions may also be specified. Sorting may be used for organizing calculation engine results for display.

Aggregation over a subset of rows of a table may be achieved through a Group function. Table-level functions may be denoted by $fn_{TAB}$. A Group operation may be expressed as:

Table$_{(AssetClass)}$=Table.Group(AssetClass)

Table$_{(AssetClass)}$←Table,AssetClass (← denotes depends on)

Group operations may be chained together to create cascading groups. Grouping of tables can be done multiple times. For instance, if asset class is mutual funds, then grouping could be by Morningstar category, sector, etc. Further grouping could be done within large cap funds, for instance, such as U.S. large cap funds versus foreign large cap funds. A subtotal could be calculated for all of an investor's mutual funds. Subtotals could also be calculated for small cap funds, mid-cap funds, and large cap funds. Within large cap, a subtotal could be calculated for U.S. large cap funds and a separate subtotal could be calculated for foreign large cap funds.

The group operation preceding other group operations may be expected to contain fields for the subsequent group operations. A general syntax may be:

Table::=Table,$fn_{TAB}$(Column*)

$fn_{TAB}$=custom|Sort|Group

A relatively simple type of formula is a field function denoted by $fn_{FLD}$.

Formula::=$fn_{FLD}$(Field*)|Table,$fn_{COL}$(Column)

$fn_{FLD}$::=custom|Multiply|Divide|Add|Subtract

To perform a computation, a field function may reference fields in the same row as the field containing the field function. Field-level functions may include multiply, divide, add, subtract and custom-specified functions such as absolute value, 1/X, and other custom-defined functions. An example of a field-level function is:

MarketValue.formula=Divide(Multiply(Price,Quantity,Valuation),FXRate)

MarketValue←Price,Quantity,Valuation,FXRate. (← denotes depends on)

This market value formula specifies that price, quantity, and valuation are multiplied and the resulting product is divided by FX rate. Valuation is an options-specific factor and FX rate refers to a foreign exchange rate. The expression following the market value formula depicts dependencies of market value on price, quantity, valuation, and FX rate.

A formula may operate on a column to perform a computation. Formulas of this type may be denoted by $fn_{COL}$. A column-level formula may specify both the table and the column to be operated on. An example of such a column operation is:

?MarketValue.formula=Table.Sum(MarketValue)

?MarketValue←Table,MarketValue

The summation market value formula above operates on a column. This formula sums market values of the specified column of the specified table. As indicated below the formula, summation market value depends upon the table and upon the market value column of the table.

The Group function may provide automatic aggregation by sub-totals. This may be achieved by combining the Group operation with a column function for aggregation. This provides a quick cache of values for the column operations and provides systematic grouping. The column functions may be used in conjunction with a Group operation for performance gains. For instance, the following expression states that MarketValue should be summed by AssetClass Group(AssetClass).MarketValue.formula=Group(AssetClass).Table.sum(MarketValue)

Group(AssetClass).MarketValue←Table,MarketValue,AssetClass

Because aggregation functions are typically dependent on the type of field, these operations do not need to be specified for each Column in the Group table. The Group function may use information from a field to determine a default aggregation behavior. This may be expressed as Group(field*).Column.formula=Group(field*).Table.{Columm,$fn_{COL}$}(Column)

Group(field*).Column←Table,Column,field*

Before evaluation takes place, the calculation engine may build a dependency graph of data dependencies. The components of the dependency graph may be tables, fields, and columns. The dependency graph may be used for preparing an execution plan. The calculation engine may walk the dependency graph starting from the top-level node's formula. Before a formula is be evaluated, the calculation engine may walk the dependencies for the formula. This process may be performed recursively until substantially all of the dependencies are evaluated and the formula (e.g., addition) can be applied.

A set of field values forms a key, which may identify a row in a table. This may be expressed as Row::=Table|[Field*]←Field* is the key to identify the row in the table Dependency graphs will now be discussed in connection with an example. Suppose the following column definitions exist:

rowid=bootstrapped-value

CUSIP.formula=DB[rowid][CUSIP]

Quantity.formula=DB[rowid][Quantity]

Price.formula=Quote[CUSIP][Price]

% $MV_{(AssetClass)}$.formula=Div(MarketValue,?MarketValue$_{(AssetClass)}$)

A dependency checker may determine that the following intermediate values will be used. Each column is assumed to have a preconfigured formula.

MarketValue.formula=Divide(Multiply(Price,Quantity,Valuation),FXRate)

Valuation.formula=Quote[CUSIP][Valuation]

FXRate.formula=Quote[CUSIP][FXRate]

AssetClass.formula=Quote[CUSIP][AssetClass]

Group(AssetClass).MarketValue

Figure 3:
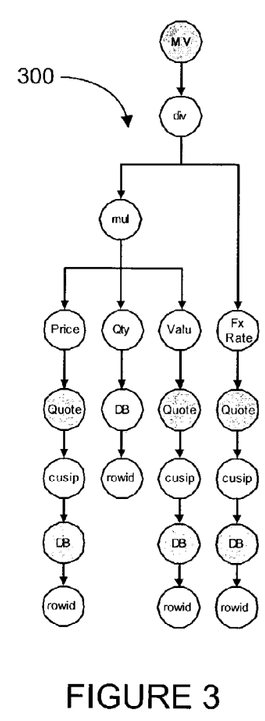
FIG. 3 depicts a dependency graph, in accordance with an illustrative embodiment of the invention, showing data dependencies for a sample calculation.

A dependency graph is prepared that indicates what the dependencies are for operands of the percentage-market-value formula. FIG. 3 shows a dependency graph for a computation of MarketValue in accordance with the formulas set forth above. The calculation is shown as a division by FX rate of the result of a multiplication of price, quantity, and valuation. Price is a quote lookup that uses CUSIP as a key for looking up a last-price value from a database. CUSIP is a standardized identifier for financial securities much like a social security number is for a U.S. citizen.

Quantity depends on a database (DB) lookup by row ID. Valuation depends on a quote lookup by CUSIP and a DB lookup by rowid. And FX rate depends on a quote lookup by CUSIP and a DB lookup by rowid. Operations, such as divisions and multiplications, are also shown.

Figure 4:
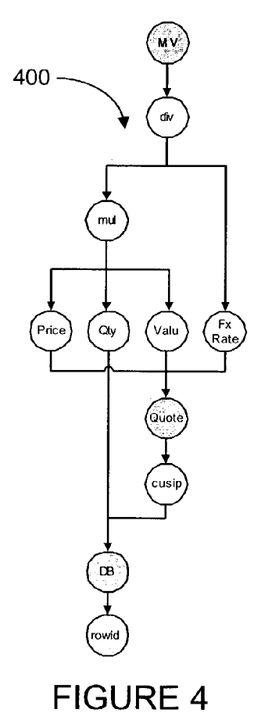
FIG. 4 is an optimized version of the dependency graph of FIG. 3.

The dependency graph of FIG. 3 is not an optimal representation because the database (DB) and quote-feed (Quote) nodes are repeated. Each repetition would translate to reevaluation by the calculation engine 200. The dependency graph 300 may be optimized by reusing the DB and Quote nodes, without changing the dependencies, as depicted in FIG. 4 by the optimized dependency graph 400. This reduces the number of quote lookups from three to one. Quantity and CUSIP are the items obtained from the DB. These DB lookups are combined into a single lookup. Optimizations may be performed starting at the bottom of the graph and working toward the top of the graph.

An optimization may be made by collecting together table functions that have common input keys but produce a number of fields as output. In this example, with reference to FIGS. 3–5:

Quote{Input Key=CUSIP}{Output=Price,Valuation, FXRate,AssetClass}

Figure 5:
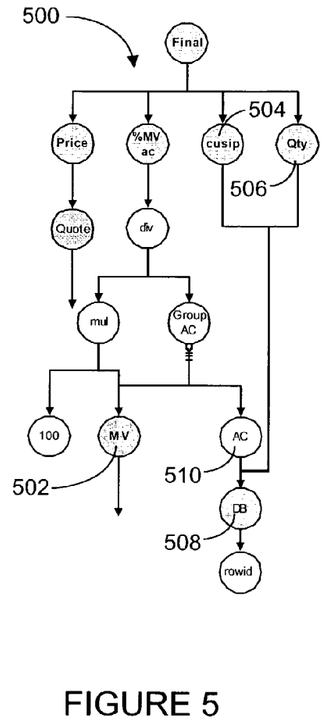
FIG. 5 is a dependency graph for sample columnset in FIG. 6.

FIG. 5 represents the main dependencies taken when computing percentage of market value by asset class. In FIG. 5, price is shown as a quote lookup. Percent market value is obtained by dividing market value by the result of a Group AC (asset class) operation. Market value is multiplied by 100 because, in this example, market value is assumed to be stored as a percentage value. The arrow below the market value node 502 indicates that market value is defined in a dependency graph, such as the dependency graph of FIG. 4. Group AC depends on market value 502 and the asset class 510 on which the grouping is being done. Group AC has a notation underneath it to indicate that it is a table operation. The dependency graph may include this information to let the Calculation engine know that the calculation engine is working on all values in the column instead of just one field.

An optimization is shown in which CUSIP 504 and quantity 506 depend directly upon the database lookup 508, as does the asset class lookup 510, so that these multiple dependencies are handled via a single database lookup.

Verifying that there are no cyclical dependencies is reduced to determining that the dependency graph is directed. Cyclical dependencies, such as a situation in which a first operand depends on a second operand and the second operand depends on the first operand, present an error condition. So, upon detecting a cyclical dependency, the calculation engine may generate an error message indicating that a cyclical dependency was detected.

The Calculation engine tries to evaluate the nodes of the dependency graph. A recursive depth-first evaluation is performed. Nodes of the lowest level are evaluated first and then nodes of the next higher level are evaluated. A higher-level node becomes ready for computation when that node's dependencies have been successfully evaluated. Any errors in dependent nodes are propagated up to higher-level nodes.

Figure 6:
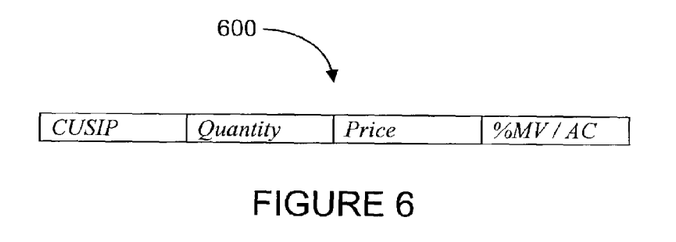
FIG. 6 depicts types of data requested to be displayed by a calculation-engine user in accordance with an illustrative example calculation specification.

Operation of the calculation engine 200 will now be discussed in the context of an example computation of percentage of market value by asset class (% MV/AC) for sample holdings within a portfolio. Suppose an investor has requested data for the columns 600 shown in FIG. 6, namely, CUSIP, Quantity, Price, and percentage of market value by asset class.

Figure 7:
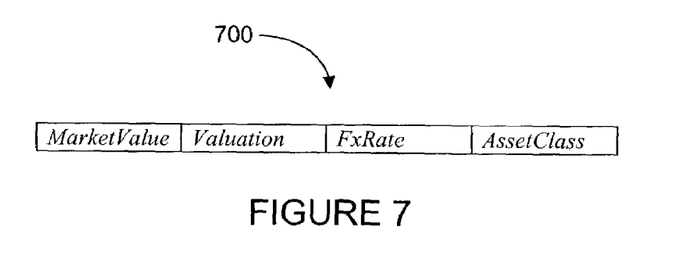
FIG. 7 shows types of data that are pertinent for generating the types of data shown in FIG. 6.
Figure 8:
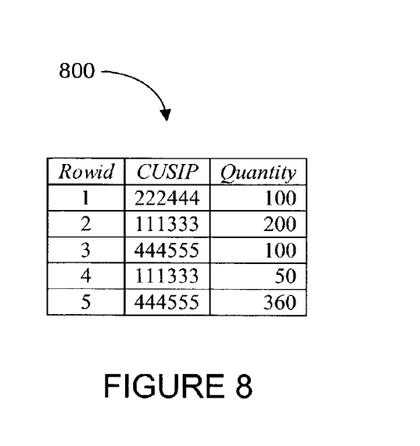
FIG. 8 depicts a table of database values initialized by gathering data from a database, in accordance with an illustrative embodiment of the invention.
Figure 9:
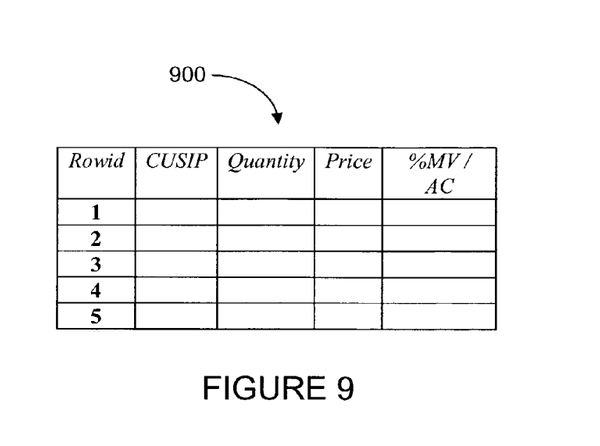

As part of a bootstrap process, the data dependencies shown in FIG. 5 may be analyzed and additional columns 700 (FIG. 7) may be determined to be pertinent. These columns are MarketValue, Valuation, FxRate, and AssetClass. A table 800 (FIG. 8) of database values may be initialized by gathering data from a database. The bootstrap process finishes by creating an initial calculation table 900 to be used by the calculation engine 200. Row IDs are transported from the initialized database table to the calculation table 900 (FIG. 9). This is the calculation engine's starting point. The calculation engine will now use this and draw in from the database if the data source is the database. Otherwise, particular fields of the calculation table 900 may be filled in from other sources. In this example, for the sake of simplicity, CUSIP and quantity come from the database. In the Figures, changes to the calculation table are bolded.

Figure 10:
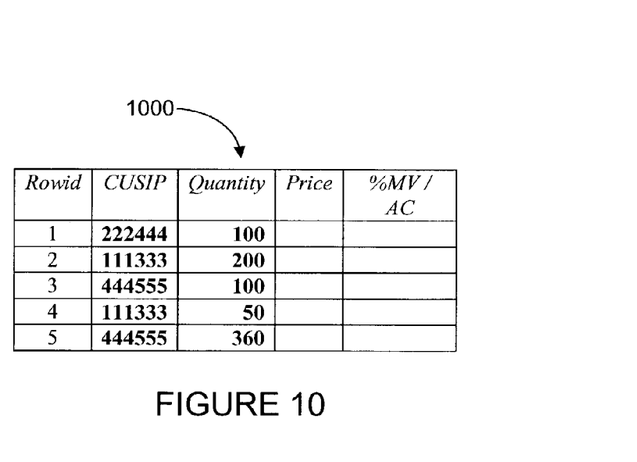
FIG. 10 depicts a calculation table, in accordance with an illustrative embodiment of the invention, with additional columns filled in from the database table of FIG. 8.

DB lookup nodes evaluate relatively simply without further dependencies. The columns CUSIP and Quantity may be filled in by the calculation engine 200 by evaluating DB[Rowid][CUSIP] and DB[Rowid][Quantity] from the database table 800 resulting in the calculation table 1000 shown in FIG. 10.

Figure 11:
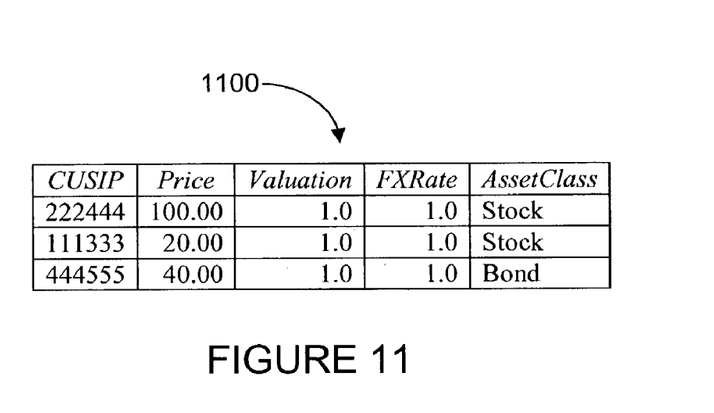
FIG. 11 depicts a table of quote table-lookup values initialized by gathering data from a quote data feed, in accordance with an illustrative embodiment of the invention.

The next node with least dependencies to lookup is the Price from a Quote table. The calculation engine may construct a Quote table 1100 (FIG. 11), much like it did for the DB table 800. The Quote table is prepared and the Price column is requested. Additional columns may be fetched and cached in the Quotes table. The Quote table may work in a manner similar to a Group table in that they both find unique CUSIP values in the parent table for which to fetch pertinent data. Stated differently, entries that would have redundant CUSIPs are merged into a single Quote-table entry. For instance, rowids 2 and 4 are consolidated and rowids 3 and 5 are consolidated.

Figure 12:
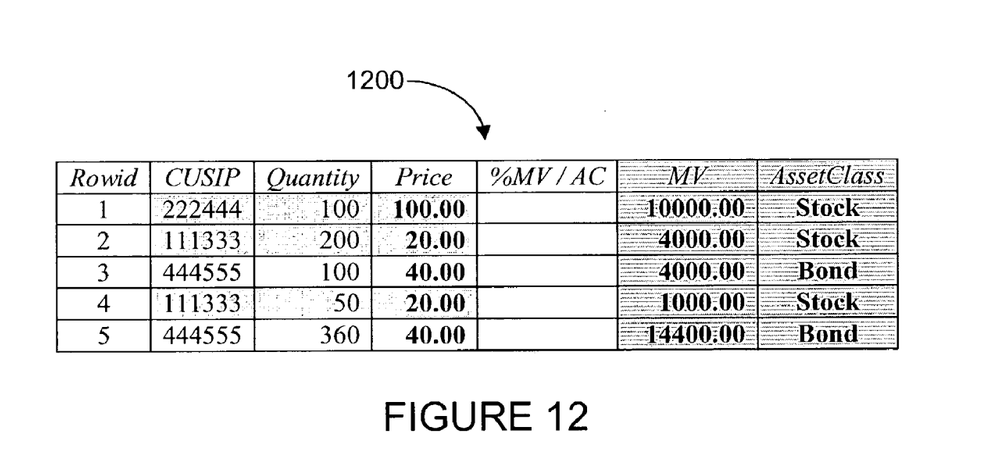
FIG. 12 depicts a calculation table, in accordance with an illustrative embodiment of the invention, with additional columns filled in from, relative to the calculation table shown in FIG. 10, and including columns shown in FIG. 7.

A calculation table 1200 (FIG. 12) includes dependent columns, namely MV and AssetClass for computing intermediate values used in calculating % MV/AC. These columns are filled in before the Group AC column function operates.

Figure 13:
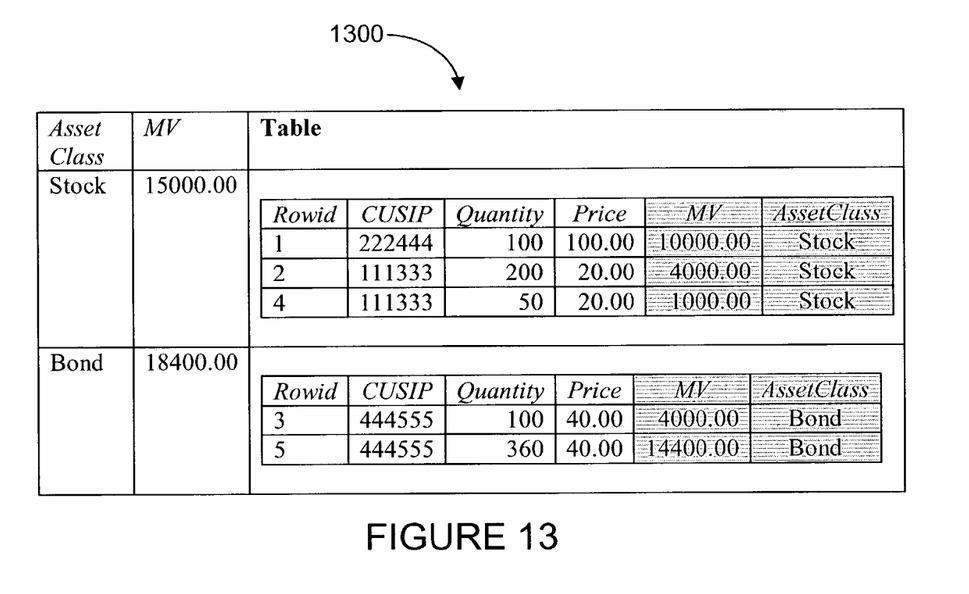
FIG. 13 depicts a group table, in accordance with an illustrative embodiment of the invention, which has two subtables embedded within the group table.

After the Group AC column operation takes place, a Group table 1300 (FIG. 13) is composed and has subtables grouped by asset class (i.e., stocks versus bonds) in the column labeled Table.

Figure 14:
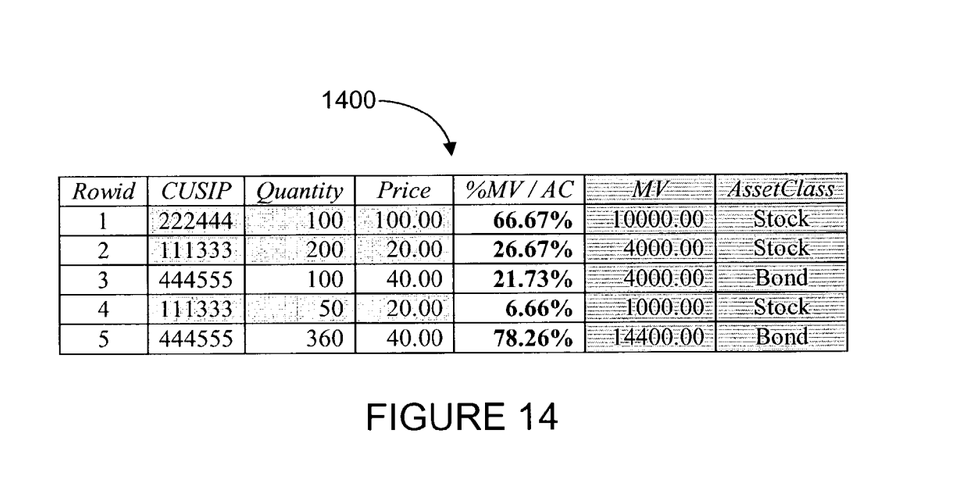
FIG. 14 depicts a calculation table, in accordance with an illustrative embodiment of the invention, which is similar to FIG. 12 and which includes values calculated using subtotaled values from the group table of FIG. 13.

Once the group table evaluation is done, the last node % MV/AC is evaluated, thereby generating calculation table 1400, which includes calculated values for percentage of market value by asset class.

The temporary columns may be pruned out, and the calculation engine 200 may output by the pruned calculation table. The example above showed a single grouping operation. Other regrouping of these grouped tables may be achieved, resulting in nested groupings. In such cases, the Group table may be returned with nested tables inside.

What has been described above is merely illustrative of the application of the principles of the invention. Those skilled in the art can implement other arrangements and methods without departing from the spirit and scope of the present invention. Any of the methods of the invention can be implemented in software that can be stored on computer disks or other computer-readable media.

The invention claimed is:

1. A computer-readable storage medium containing computer-executable instructions for implementing a programmable calculation engine by performing operations comprising:

accepting, as input, a user-definable calculation specification that includes:

a primary formula that references at least a first data source, and an ordered list containing at least one fallback formula for use upon occurrence of a failure associated with evaluating the primary formula;

generating a dependency tree that includes a plurality of nodes that indicate that at least one operand of at least one of the formulas depends on at least one of another operand and one of the data sources;

optimizing the dependency tree by combining redundant nodes into a single node;

generating calculation results by performing operations in accordance with the calculation specification and in accordance with the dependency tree; and outputting the calculation result.

2. The computer-readable storage medium of claim 1, wherein at least one of the data sources includes a real-time stock-quote data feed.

3. The computer-readable storage medium of claim 1, comprising further computer-executable instructions for performing the step of: checking the dependency tree for cyclical dependencies.

4. The computer-readable storage medium of claim 1, comprising further computer-executable instructions for performing the step of: automatically aggregating data by subtotaling.

5. The computer-readable storage medium of claim 1, wherein at least one of the data sources includes a database table.

6. The computer-readable storage medium of claim 1, wherein at least one of the data sources includes a calculation table generated by performing an aggregation operation on a table.

* * * * *